(12) United States Patent
Ko et al.

(10) Patent No.: US 9,916,796 B2
(45) Date of Patent: Mar. 13, 2018

(54) LIQUID CRYSTAL DISPLAY DEVICE WITH REPAIR FUNCTION AND REPAIR TYPE DATA FORMAT STRUCTURE

(71) Applicant: Magnachip Semiconductor, Ltd., Cheongju-si (KR)

(72) Inventors: Jae Hong Ko, Seoul (KR); Shin Yoon, Seoul (KR); Jong Soo Kim, Yongin-si (KR)

(73) Assignee: Magnachip Semiconductor, Ltd., Cheongju-si (KR)

( * ) Notice: Subject to any disclaimer, the term of this patent is extended or adjusted under 35 U.S.C. 154(b) by 272 days.

(21) Appl. No.: 14/809,459

(22) Filed: Jul. 27, 2015

(65) Prior Publication Data

US 2016/0085094 A1 Mar. 24, 2016

(30) Foreign Application Priority Data

Sep. 23, 2014 (KR) .......................... 10-2014-0126545

(51) Int. Cl.
*G09G 3/36* (2006.01)
*G02F 1/1362* (2006.01)

(52) U.S. Cl.
CPC ......... *G09G 3/36* (2013.01); *G02F 1/136259* (2013.01); *G09G 3/3685* (2013.01); *G02F 2001/136263* (2013.01); *G09G 2330/08* (2013.01)

(58) Field of Classification Search
CPC ...................... G02F 1/136259; G09G 3/3685
See application file for complete search history.

(56) References Cited

U.S. PATENT DOCUMENTS

| | | | | |
|---|---|---|---|---|
| 7,609,246 B2* | 10/2009 | Hsu | ...................... | G09G 3/3611 345/93 |
| 8,023,058 B2* | 9/2011 | Han | .................. | G02F 1/136259 349/139 |
| 2007/0109235 A1* | 5/2007 | Hsu | ...................... | G09G 3/3611 345/87 |
| 2009/0059112 A1* | 3/2009 | Lu | ......................... | G09G 3/3688 349/55 |
| 2010/0214503 A1* | 8/2010 | Lee | ................... | G02F 1/136259 349/54 |
| 2012/0147311 A1* | 6/2012 | Chen | ................. | G02F 1/136259 349/139 |

FOREIGN PATENT DOCUMENTS

KR 10-0929678 B1 12/2009

* cited by examiner

*Primary Examiner* — Phu Vu
(74) *Attorney, Agent, or Firm* — NSIP Law

(57) ABSTRACT

The present examples relate to a liquid crystal display device with a repair function. The present examples repair a defect of a line or a defect of a pixel, using a specialized data signal structure, wherein the data signal structure integrates channel data, which is required for channel driving of a liquid crystal display element, and repair amplifier data, which is used for repairing a defect of a line and/or a pixel. Thus, examples have a better repair function than an alternative liquid crystal display device.

19 Claims, 4 Drawing Sheets

LIQUID CRYSTAL DISPLAY DEVICE WITH REPAIR FUNCTION AND REPAIR TYPE DATA FORMAT STRUCTURE

CROSS REFERENCE TO RELATED APPLICATION(S)

This application claims the benefit under 35 USC 119(a) of Korean Patent Application No. 10-2014-0126545 filed on Sep. 23, 2014 in the Korean Intellectual Property Office, the entire disclosure of which is incorporated herein by reference for all purposes.

BACKGROUND

1. Field

The following description relates to a liquid crystal display device. The following description also relates to a liquid crystal display device with a repair function and a repair type data format structure with an improved repair function by providing a new data format structure, integrating channel data for channel drive and repair amplifier data, which is used for repairing a defect of a liquid crystal line.

2. Description of Related Art

Generally, liquid crystal display devices, such as Liquid Crystal Display (LCD) or Organic Light Emitting Diode (OLED) displays, show an image by using a switching element, a plurality of thin film transistors, and a pixel electrode, which is connected to a thin film transistor, that exist in a matrix.

The thin film transistor includes a gate electrode, an active layer and a source electrode and a drain electrode and herein, the gate electrode and the source electrode, share one transverse line or one longitudinal line. The transverse line is generally called as a gate line, as the transverse line transmits a pulse voltage that drives a gate electrode. The longitudinal line is called as a data line, as the longitudinal line transmits a signal voltage that drives a source electrode.

When a pulse is scanned into the gate line, a pulse is applied to the gate electrode of thin film transistor that is a switching element, and when a signal voltage is applied to the data line, a signal is applied to the source electrode of the thin film transistor. At this time, a voltage, which may drive a liquid crystal, is applied by an arbitrary source electrode of a signal of the gate electrode, and when a voltage, which is smaller than the liquid crystal driver voltage, is applied to the rest, a pixel, only applied with a liquid crystal driver voltage, will operate. It is possible to drive all pixel electrodes of a liquid crystal display device by applying a pulse in rotation to the all gate electrodes and by applying a signal voltage to the relevant source electrodes by this operational principle.

However, a defect that occurs in an opened liquid crystal line, that is, a gate line or a data line, is potentially the main reason of a process yield decrease in a liquid crystal display device manufacturing process. For example, when one of liquid crystal lines is disconnected, all of the thin film transistors connected with the opened line become inoperative, which soon causes a fatal defect in a liquid crystal display element.

Therefore, countermeasures regarding a defect of the occurrence of an opened liquid crystal line have become an important issue. In an effort to solve this problem, measures using a repair line were drawn up, which are presented with reference to FIG. 1.

FIG. 1 is a schematic plan view of a liquid crystal display device according to an example.

Accordingly, a liquid display element 100 is illustrated, which displays information on a liquid crystal display device as shown in the drawing. In the example of FIG. 1, a liquid display element 100 is an LCD panel or an OLED panel.

An Integrated Circuit (IC) 110 that drives a liquid display element 100 is included. In a case in which a defect of an opened liquid crystal line occurs, a display driver IC 110 is designed to include built-in two repair amplifiers 120, 130 that provide the ability to repair the relevant liquid crystal line.

A printed circuit board (PCB), not shown in the drawing, is placed on an output terminal of the repair amplifiers 120, 130. Hence, the repair amplifiers 120, 130 are connected with repair lines 122, 132 via PCB lines 121, 131. In the drawing, PCB lines 121, 131 and repair lines 122, 132 are each shown as one line. However, PCB lines 121, 131 are a line formed on the portion of a printed circuit board that are located in the vicinity of a liquid crystal display element 100.

In this kind of liquid crystal display device, when an arbitrary liquid crystal line is opened, a liquid crystal line is repaired using repair lines 122, 132.

However, the liquid crystal display device of FIG. 1 confronts the following issue.

The structure of FIG. 1 has a form that has to directly apply the grayscale of a relevant liquid crystal line from outside in case a liquid crystal line is opened. In other words, since the grayscale of an opened liquid crystal line is not known, the grayscale is preferably applied via an input terminal of repair amplifiers 120, 130. Moreover, a decoder that respectively responds with each repair amplifier, and a channel amplifier that drives a liquid crystal display device, is to be provided. These structures become a cause of complexity of a liquid crystal display device.

Additionally, in FIG. 1, an output of the repair amplifiers 120, 130 that is potentially to be sent along lines across the PCB that is formed on a circumference of a liquid crystal display device 100, as repair amplifiers 120, 130 are placed in a middle section of a display driver IC 110. This causes a problem of increased complexity of the PCB.

Moreover, when the repair lines 122, 132 lengthen, a resistance of the repair lines 122, 132 increases accordingly, and hence, causes a problem of generating a loss in the transmitted driver signal that is delivered via the repair lines 122, 132. In this case, if a liquid crystal display device 100 size grows, repair lines 122, 132 lengthen but due to limitations of the driving ability of a display driver IC 110, an opened liquid crystal line may be expected to be irreparable in some cases.

Further, because according to the structure of FIG. 1, since repair lines 122, 132, formed on a border of a liquid crystal element 100, are provided only singly each, an additional signal to select either a pixel electrode defect or a liquid crystal defect, is required. For example, when the cause of defect that is generated in one portion is a pixel electrode, a driving signal is to be transmitted according to the defect cause, whereas a driving signal repairing the liquid crystal line is to be transmitted when a cause is a liquid crystal line.

Thus, circuit structure complexity increases in the structure of FIG. 1.

Moreover, a control line repair amplifier Control DC line is also required to apply a control signal to control on/off operation of a repair amplifier in alternative approaches.

Thus, measures for easier repair are advantageous when a defect in a liquid crystal line of a liquid crystal display device occurs.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A feature of the present examples is to solve the problems discussed with respect to defects in a liquid crystal device by providing a liquid crystal display device and repair type data format structure for a new data format structure including repair amplifier data and channel data together on the packet data of the channel to recognize the data which drive repair data as real channel data. Examples also repair defects of a line or a pixel with the new data format structure.

Further, the data format structure includes a control signal that can process on/off operation of a repair amplifier.

Further, another feature of the present examples is to improve the overall complexity of a liquid crystal display device by altering an equipment location of a repair amplifier.

A liquid crystal display device with a repair function and a repair type data format structure of the present examples has the following effects.

The present examples provide a new channel data signal by embedding repair amplifier data on at least one of the front terminal and back terminal. The new channel data signal is then provided to a repair amplifier via a data line. Thus, an efficient design of a display driver IC is possible because a circuit structure of a liquid crystal display device is potentially more simplified than additional repair amplifier data that is input into a traditional repair amplifier using an input terminal. For example, because there is no need to directly input amplifier data into a repair amplifier, a line of a repair amplifier is potentially omitted. Moreover, a control line, such as a Repair Amplifier Control DC line is also potentially eliminated, where such a control line was previously necessary to control on/off operation of a repair amplifier. Also, a data value of a pixel or a line driven by a repair amplifier is able to be processed while a repair amplifier and a channel amplifier are sharing a decoder. Accordingly, a display driver IC design is simplified and its efficiency can be maximized.

Moreover, the area efficiency of a display driver IC is potentially increased because channel data and repair amplifier data are transmitted together using one data bus.

Moreover, an improved effectiveness of a repair function is potentially expected with regards to a defective line and pixel by decreasing a load, which is caused by a traditional PCB line, as a repair amplifier is formed on both of the display driver IC end terminals.

Moreover, in examples, continuity and image quality feature are obtained, by eliminating gamma differences between a repaired pixel and a general pixel, by sharing a data bus and a gamma line.

In one general aspect, a liquid crystal display device includes a liquid crystal display and a display drive Integrated Circuit (IC), a first input terminal and second input terminal located on the display drive IC, a first repair amplifier connected to the first input terminal and a second repair amplifier connected to the second input terminal and located on the display drive IC, and a repair line connected to respective output terminals of the first repair amplifier and the second repair amplifier, wherein a liquid crystal line or pixel of the liquid crystal display is repaired using the repair line.

The first repair amplifier may include a first line repair amplifier and a first pixel repair amplifier connected to the first input terminal and the second repair amplifier may include a second line repair amplifier and a second pixel repair amplifier connected to the second input terminal.

The first repair amplifier and second repair amplifier may be formed on a left side and a right side of the display drive IC, respectively.

The input terminal of each of the first and second repair amplifiers may be connected to a data bus.

The first and second repair amplifiers may receive inputs of a channel data signal including channel data and repair amplifier data through the data bus.

The channel data signal may include a first region of predetermined length and a second region formed including the channel data and the repair amplifier data.

The repair amplifier data may be located on the front and/or back of the channel data in the second region.

The repair amplifier data may include line repair amplifier data and pixel repair amplifier data.

The line repair amplifier data and the pixel repair amplifier data may each be N bits in length, respectively.

The repair amplifier data may be formed to have more than two regions.

The first region may include control bits that select the operation of the first line repair amplifier and the first pixel repair amplifier or the second line repair amplifier and the second pixel repair amplifier and slew rate control bits that select a slew rate of an operating repair amplifier.

The slew rate control bits may be N bits in length.

The repair amplifier data of the second region may include R/G/B control bits which select Red (R), Green (G), Blue (B) values of a repair amplifier operating using a channel data signal applied to the repair amplifier.

The liquid crystal display device may include the R/G/B control bits that are each respectively N bits in length.

In another general aspect, a repair type data format structure includes a channel data signal that repairs a defect of a line or a pixel of a liquid crystal display device, wherein the channel data signal includes a first region comprising a control bit that selects a line repair amplifier or a pixel repair amplifier and slew rate control bits, and a second region comprising a channel data region and a repair amplifier data region.

The repair amplifier data region may include a line repair amplifier data region and a pixel repair amplifier data region.

The repair amplifier data region may include R/G/B control bits which select Red (R), Green (G), Blue (B) values of a pixel or a line.

The second region including the amplifier data region may be located on one of front terminal, back terminal, or front and back terminals of the channel data region.

In another general aspect, a liquid crystal display device includes a liquid crystal display, and a display drive IC (Integrated Circuit), located on the liquid crystal display, including a first input terminal including a first repair amplifier and a second input terminal including a second repair amplifier, wherein the liquid crystal display receives a repair signal from the first repair amplifier or the second repair amplifier and repairs a liquid crystal line or pixel of the liquid crystal display using the repair signal.

The repair signal may be received using a repair line that is connected to respective output terminals of the first repair amplifier and the second repair amplifier.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The present examples solve various problems of other liquid crystal display devices. The present examples provide a new data format structure by embedding input data of a repair amplifier which, when used for a liquid crystal defect in a channel data signal, manage the operation of the channel driving of a liquid crystal device thereof. Moreover, the present examples improve the equipment location structure of a repair amplifier.

Moreover, the present examples are illustrated as taking a driving R/G/B control bit of 8 bits each in a liquid crystal display device, as an example, but the examples are not limited to this particular example, and using other information as bit widths for control bits is possible in other examples. Further, data used in a line repair amplifier and a pixel repair amplifier is recited as having a bit width of 24 bits but this bit width also does not have to be limited to this example. For example, an R/G/B control bit is potentially designed in different bit configurations, because in alternative configurations, such as either 6 bits or 12 bits, the R/G/B control bit is the same. Hence, a data width used in a repair amplifier is also possibly either 18 bits or 36 bits in size. Moreover, the slew rate control bits, which select repair amplifier slew rate, is also recited as being 3 bits, as an example, but also other bit information can be applied. In other words, a different bit width can be applied by the designer to convey and manage relevant information.

The example of a liquid crystal display device with repair function of the present invention is recited in additional detail, referring to the attached drawings.

Figure 1:
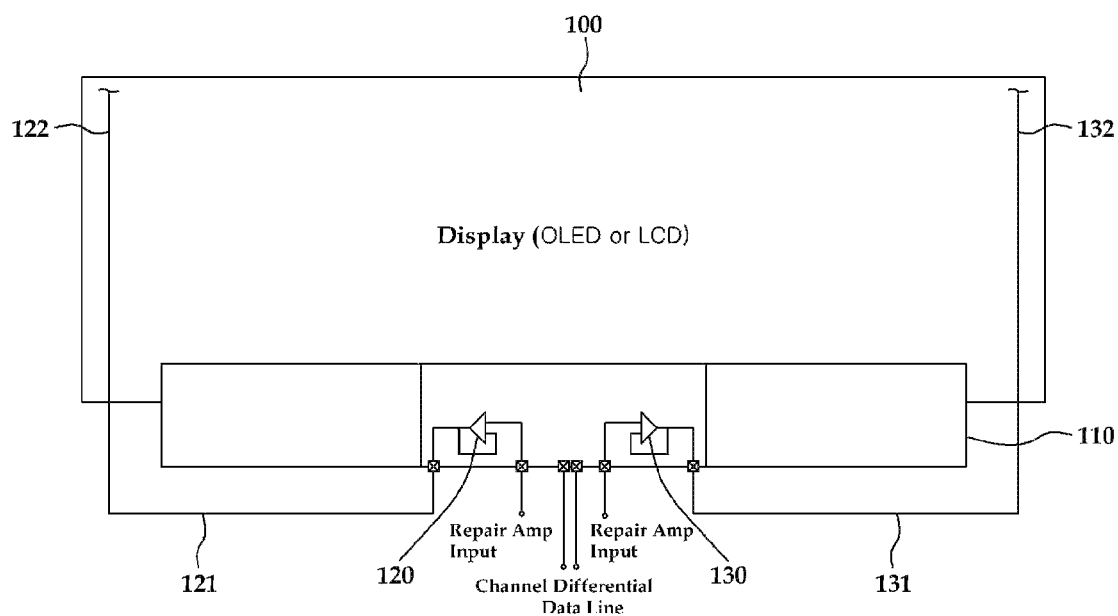
FIG. 1 is a schematic view of a liquid crystal display device.
Figure 2:
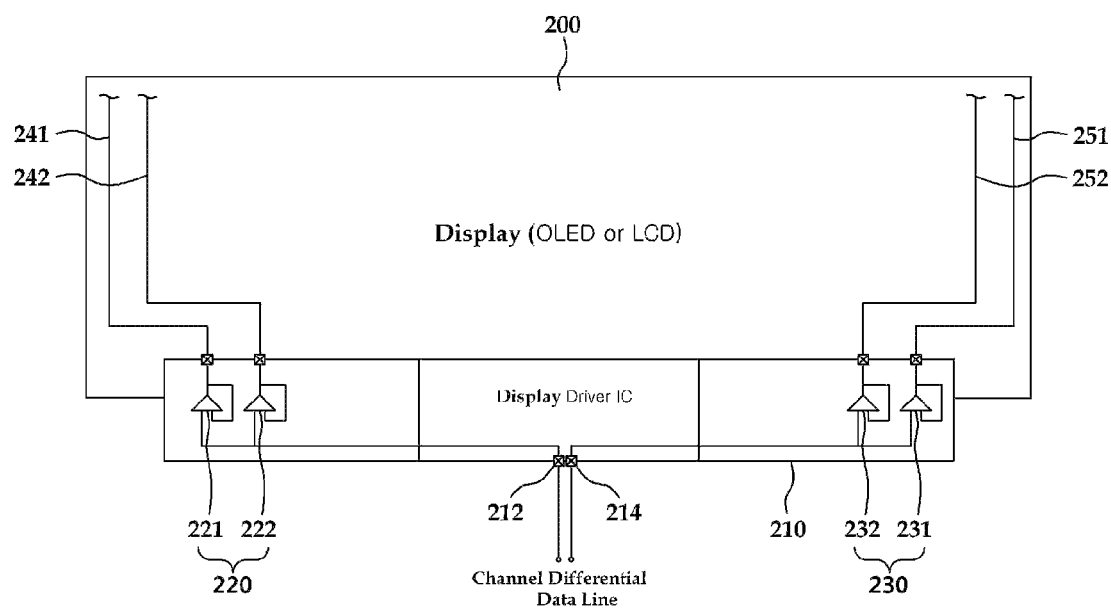
FIG. 2 is a block diagram of a liquid crystal display device with repair function, according to an example.

FIG. 2 shows a block diagram of a liquid crystal display device with repair functionality, according to an example.

Thus, the example includes a liquid crystal display element 200 that displays information on a liquid crystal display device, as shown in the example of FIG. 2. In an example, a liquid crystal display element 200 is potentially either be a LCD panel or an OLED panel, but these are only examples and other alternative related liquid crystal display technologies are potentially used in examples.

FIG. 2 shows a display driver IC 210 that drives a liquid crystal display element 200. A display driver IC 210 forms an input terminal to receive input of channel data that is necessary for channel driving. An input terminal is differentiated into a first input terminal 212 and a second input terminal 214. For example, the first input terminal 212 and the second input terminal 214 are connected to the repair amplifier, as recited below.

Left and right repair amplifiers are formed as terminal on each end of a display driver IC 210. With reference to the example of FIG. 2, on a left side of a display driver IC 210 a first repair amplifier 220 is formed and on a right side of a display driver IC 210 second repair amplifier 230 is formed. A first repair amplifier 220 and a second repair amplifier 230 include two portions each. Thus, a first repair amplifier 220 is differentiated into a 1-1 repair amplifier 221 and a 1-2 repair amplifier 222 situated on a left side, and a second repair amplifier 230 is differentiated into a 2-1 repair amplifier 231 and a 2-2 repair amplifier 232 situated on a right side. In the example of FIG. 2, a 1-1 repair amplifier 221 and a 2-1 repair amplifier 231 are liquid crystal line type repair amplifiers used to repair liquid crystal line defects, and a 1-2 repair amplifier 222 and a 2-2 repair amplifier 232 are pixel type repair amplifiers used to repair pixel defect. Thus, in the following disclosure, a 1-1 repair amplifier 221 is referred to as a '1-1 line repair amplifier', a 2-1 repair amplifier 231 is referred to as a '2- 1 line repair amplifier', a 1-2 repair amplifier 222 is referred to as a '1-2 pixel repair amplifier' and a 2-2 repair amplifier 232 is referred to as a '2-2 pixel repair amplifier'.

The repair amplifiers 221, 222, 231, 232 receive channel data signals via a first input terminal 212 and a second input terminal 214. A channel data signal uses a new form of format structure, including both data for channel driving and repair data for repairing of a liquid crystal or a pixel. Disclosure regarding a channel data signal is recited below in further detail, referring to FIGS. 3 to 5.

Repair lines 241, 242, 251, 252 are connected to an output terminal of the repair amplifiers 221, 222, 231, 232. The repair lines 241, 242, 251, 252 of the present example include a structure, directly connected with a liquid crystal line, but not via a printed circuit board. Meanwhile, repair lines 241, 242, 251, 252 differ from one another according to the functionality of repair amplifiers 221, 222, 231, 232. In other words, repair lines 241, 251 of the 1-1 repair amplifier 221 and of the 2-1 repair amplifier 231 are configured for liquid crystal line defect repair, and repair lines 242, 252 of a 1-2 repair amplifier 222 and of a 2-2 repair amplifier 232 are configured for pixel defect repair.

The following disclosure relates, in further detail, to channel data.

Figure 3:
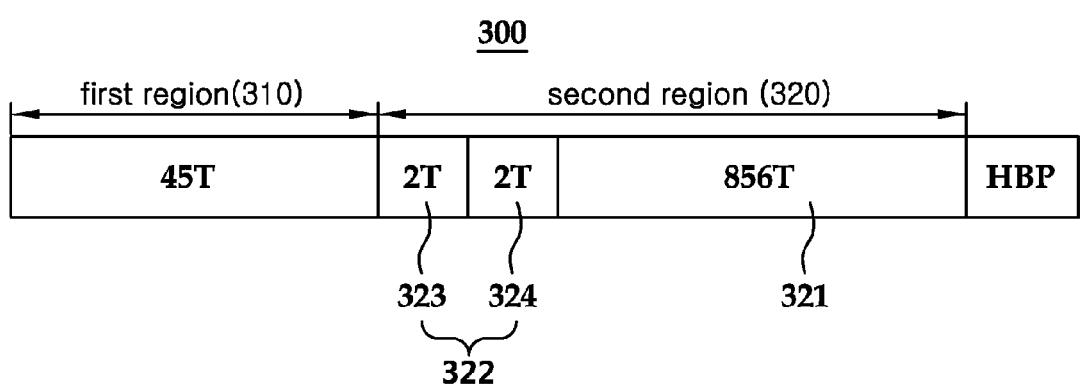
FIG. 3 is a block diagram of various format of channel data signal with a repair amplifier data inserted, according to an example.
Figure 4:
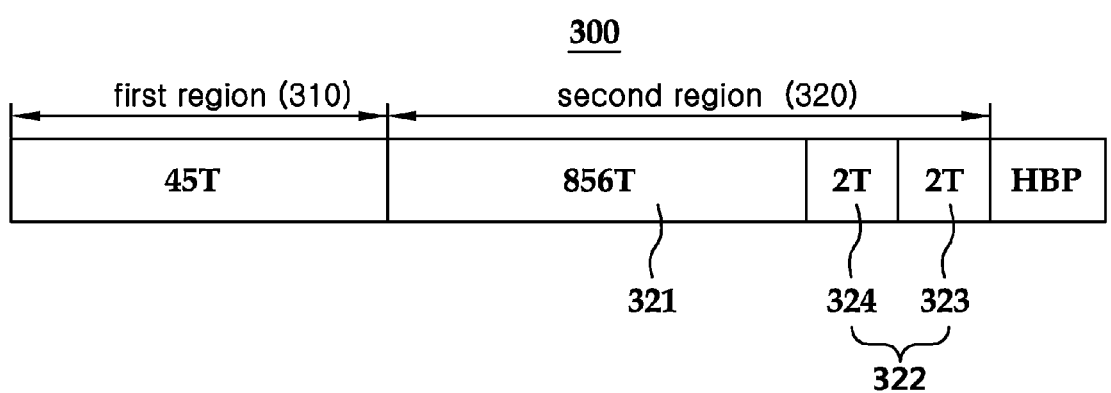
FIG. 4 is another block diagram of various format of channel data signal with a repair amplifier data inserted, according to an example.
Figure 5:
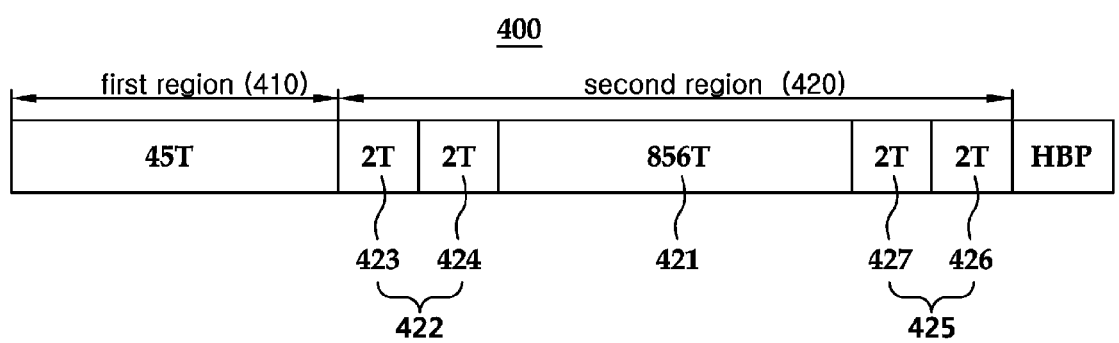
FIG. 5 is another block diagram of various format of channel data signal with a repair amplifier data inserted, according to an example.

FIGS. 3 to 5 are block diagrams of diverse formats of a channel data signal in which repair amplifier data is inserted according to the present examples.

A first channel data signal structure is shown in FIG. 3.

A channel data signal includes a first region 310 and a second region 320.

The first region 310 includes data required for digital control. 45T data is provided on a first region in the example, wherein, 1T means a set of 12 bit channel data. Such a first region 310 includes a series of control signals. A control signal includes control bits that are able to select operation of a 1-1 line repair amplifier 221, a 2-1 line repair amplifier 231, a 1-2 pixel repair amplifier 222, and a 2-2 pixel repair amplifier 232. Moreover, a control signal includes, for example, control bits of 3 bits respectively, to control a slew rate of a 1-1 line repair amplifier 221, a 2-1 line repair amplifier 231, a 1-2 pixel repair amplifier 222, and a 2-2 pixel repair amplifier 232. This configuration is shown in Table

TABLE 1

| 0 bit | 1 bit | 2 bit | 3 bit | 4 bit | 5 bit | 6 bit | 7 bit | 8 bit | 9 bit | 10 bit | 11 bit |
|---|---|---|---|---|---|---|---|---|---|---|---|
| 1T | LRASLEW<0> | | | LRASLEW<1> | | | LRASLEW<2> | | | LRADATA<0> | |
| 2T | LRADATA<1> | | | PRASLEW<0> | | | PRASLEW<1> | | | PRASLEW<2> | |
| 3T | PRADATA<0> | | | PRADATA<1> | | | RADIR | | | | |

In Table 1, the "RADIR" value is a set of control bits that control on/off operation of a repair amplifier, and can turn on and off a 1-1 line repair amplifier 221, a 2-1 line repair amplifier 231, a 1-2 pixel repair amplifier 222, and a 2-2 pixel repair amplifier 232.

Moreover, "LRASLEW" stands for Line Repair Amplifier SLEW and "PRASLEW" stands for Pixel Repair Amplifier SLEW. A slew rate refers to the maximum rate of change of output voltage per unit of time and is expressed as volts per second. For example, a slew rate of a 1-1 line repair amplifier 221, a 2-1 line repair amplifier 231, a 1-2 pixel repair amplifier 222, and a 2-2 pixel repair amplifier 232 is selected through "LRASLEW" and "PRASLEW." Moreover, a slew rate is determined according to each group of three bits, and a slew rate of each repair amplifier, according to respective values, is determined as shown in the following Table 2.

TABLE 2

| SLEW<2:0> | REPAIR AMPLIFIER SLEW |
|---|---|
| 000 | Slower |
| 001 | ↓ |
| 010 | |
| 011 | |
| 100 | |
| 101 | |
| 110 | |
| 111 | Faster |

According to Table 2, a speed corresponding to repair amplifier slew rate speed is provided differently according to a value of a set of bits.

Meanwhile, a set of control bits that controls the slew rate can be N bits, but in the case of over 4 bits, the above repair amplifier slew rate is potentially more fragmented than in Table 2.

A second region 320 is an active data area. The second region 320 includes a channel data region 321 and a repair amplifier data region 322.

In the example of FIG. 3, a channel data of a channel data region 321 includes 856T data, and when 856T is converted by 8 bits, the channel data becomes 1284 channel (CH) data.

A repair amplifier data region 322 is placed on a front terminal of a channel data region 321. Moreover, a repair amplifier data region 322 includes a line repair amplifier data region 323 and a pixel repair amplifier data region 324, and each has 2T data. Thus, a repair amplifier data region 322 has a total of 4T (48 bits) data. Through this, a 1-1 line repair amplifier 221, and a line of 1-2 pixel repair amplifier 222, located on the left side of a display drive IC 210 or R (8 bits), G (8 bits), B (8 bits) of pixel, is selected. This is presented in further detail in the following Table 3.

TABLE 3

| | bit | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 1T | Line Left R Repair Amp Data | | | | | | Line Left G Repair Amp Data | | | | | |
| 2T | Line Left G Repair Amp Data | | | | | | Line Left B Repair Amp Data | | | | | |
| 3T | Pixel Left R Repair Amp Data | | | | | | Pixel Left G Repair Amp Data | | | | | |
| 4T | Pixel Left G Repair Amp Data | | | | | | Pixel Left B Repair Amp Data | | | | | |

With reference to the example of Table 3, a line which needs repair or R/G/B values of a pixel is selected.

A structure of another channel data signal is shown in the example of FIG. 4.

By comparison to a channel data signal of the recited above FIG. 3, a channel data signal of FIG. 4 only differs in that repair amplifier data region 322 is placed on a back terminal of a channel data region 321, while the other portions of the structure are identical. Thus, only repair amplifier data region 322 is illustrated in detail in the example of FIG. 4.

Moreover, in case in which a repair amplifier data region 322 is placed on a back terminal of a channel data region 321, a pixel repair amplifier data region 324 and line repair amplifier data region 323 are placed on the repair amplifier data region 322. In other words, in comparison to FIG. 3, these elements are symmetrically arranged. Likewise, a pixel repair amplifier data region 324 and a line repair amplifier data region 323 each respectively have 2T data, and hence, have 4T (48 bits) in total. Through this data, a 2-1 line repair amplifier 231 placed on the right side of display driver IC 210 and a 2-2 pixel repair amplifier of a line or R (8 bits), G (8 bits), B (8 bits) values of a pixel can be selected. This information is recited in detail in the following Table 4.

TABLE 4

|    | 0 | 1 | 2 | 3 | 4 | 5 | 6 | 7 | 8 | 9 | 10 | 11 |
|----|---|---|---|---|---|---|---|---|---|---|----|----|
| 1T | Pixel Right R Repair Amp Data | | | | | | | | Pixel Right G Repair Amp Data | | | |
| 2T | Pixel Right G Repair Amp Data | | | | | | | | Pixel Right B Repair Amp Data | | | |
| 3T | Line Right R Repair Amp Data | | | | | | | | Line Right G Repair Amp Data | | | |
| 4T | Line Right G Repair Amp Data | | | | | | | | Line Right B Repair Amp Data | | | |

Meanwhile, FIG. 3 and FIG. 4, as recited above, show that a repair amplifier data region is placed on a front terminal, such as at a left side, or a back terminal, such as at a right side, of a channel data region to control repair amplifier operation such that the repair amplifier is located at a left side or a right side of the display driver IC. However, the present examples are not necessarily limited to this configuration. In other words, repair amplifier operation is controllable by placing a repair amplifier data region on both a front terminal and a back terminal of a channel data region 231.

This approach is illustrated in the example of FIG. 5. According to the example of FIG. 5, a channel data signal is formed by placing respective repair amplifier data regions 422, 425 on a front terminal and a back terminal of a channel data region 421.

Herein, FIG. 5 at 423 illustrates control bits which select R/G/B values of a 1-1 line repair amplifier 221, FIG. 5 at 424 illustrates control bits which select R/G/B values of a 1-2 pixel repair amplifier 222, FIG. 5 at 427 includes control bit which select R/G/B values of a 2-2 pixel repair amplifier 232, FIG. 5 at 426 includes control bits which select R/G/B values of a 2-1 line repair amplifier 231. In other words, an operation regarding FIG. 5 is identical with said Table 3 and Table 4. Hence, left side repair amplifier data regions 423, 424, in FIG. 5, select a line of a 1-1 line repair amplifier 221 and a 1-2 pixel repair amplifier 222 or R (8 bits), G (8 bits), B (8 bits) of a pixel, referring to Table 3. Moreover, right side repair amplifier data regions 427, 426 select a pixel of a 2-2 pixel repair amplifier 232 and a 2-1 line repair amplifier 231 or R (8 bits), G (8 bits), B (8 bits) of the line, referring to Table 4.

Likewise, the example of FIG. 5 illustrates enabling the processing of channel data 421 and repair amplifier data 422, 425 together during the processing of channel data by inserting repair amplifier data 422, 425 at the front terminal and the back terminal of channel data 421.

Figure 6:
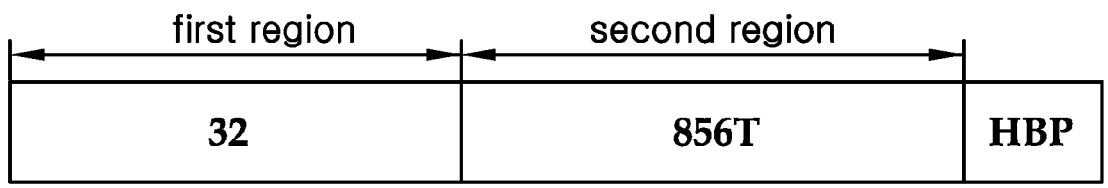
FIG. 6 is a format block diagram of another channel data signal in comparison with a channel data signal of the present examples.

A channel data signal, as presented in the present examples, has a completely different structure from a data structure used in a liquid crystal display device of alternatives. For example, FIG. 6 shows a channel data signal according to an alternative, and the example of FIG. 6 shows that only channel data is included in a second region and repair amplifier data is excluded from the structure shown in FIG. 6.

Next, aspects of the operation of a liquid crystal display device using the above technology are recited.

A channel data signal is applied to a first input terminal 212 and to a second input terminal 214 of a liquid crystal display device via a data bus. As discussed further above, a structure of channel data signal includes a channel data and a repair amplifier data.

A 1-1 line repair amplifier 221, a 2-1 line repair amplifier 231, a 1-2 pixel repair amplifier 222, and a 2-2 pixel repair amplifier 232 selectively operate according to a channel data signal input by a first input terminal 212 or by a second input terminal 214, and therefore, a slew rate of respective repair amplifiers 221, 222, 231, 232 is controlled and managed.

The above repair amplifier driving approach is recited in detail, referring to the following Table 5.

TABLE 5

| RADIR | LRADATA <1:0> | LRAMP_R | LRAMP_L | PRADATA <1:0> | PRAMP_R | PRAMP_L |
|---|---|---|---|---|---|---|
| 0 | 00 | OFF | OFF | 00 | OFF | OFF |
|   | 01 | R | OFF | 01 | R | OFF |
|   | 10 | G | OFF | 10 | G | OFF |
|   | 11 | B | OFF | 11 | B | OFF |
| 1 | 00 | OFF | OFF | 00 | OFF | OFF |
|   | 01 | OFF | R | 01 | OFF | R |
|   | 10 | OFF | G | 10 | OFF | B |
|   | 11 | OFF | B | 11 | OFF | G |

Hence, the RADIR value included in a channel data signal is '0' or '1' and in examples, a 1-1 line repair amplifier 221 and a 1-2 pixel repair amplifier 222, a 2-1 line repair amplifier 231, and a 2-2 pixel repair amplifier 232 are selected appropriately. In other words, when RADIR value is '0', a 1-1 line repair amplifier 221 and a 1-2 pixel repair amplifier 222 are off. By contrast, when RADIR value is '1', a 2-1 line repair amplifier 231 and a 2-2 pixel repair amplifier 232 are off.

Additionally, a line of an on driven repair amplifier or R/G/B value of a pixel is determined according to a LRADATA (Line Repair Amplifier DATA) value and a PRADATA (Pixel Repair Amplifier DATA) value. For example, under the condition in which RADIR is '0', when the value of LRADATA is [0:1], R (red) is selected, when [1:0], G (green) is selected, and when [1:1], B (blue) is selected. In this case, a repair is processed according to the operation of a 2-1 line repair amplifier 231.

Likewise, the present examples provide a format structure of a channel data signal that is applied via a data line by inserting repair amplifier data into channel data. Moreover, the channel data signal includes control bits that select a left or right repair amplifier, control bits which select a slew rate of a repair amplifier, and a control bit which selects an R/G/B portion of a repair amplifier. Through this structure, a repair operation is processed more efficiently when defect of a liquid crystal line or pixel occurs.

The image display apparatus described herein may be implemented using a liquid crystal display (LCD), a light-emitting diode (LED) display, a plasma display panel (PDP), a screen, a terminal, or any other type of display known to one of ordinary skill in the art. A screen may be a physical structure that includes one or more hardware components that provide the ability to render a user interface and receive user input. The screen may include any combination of a display region, a gesture capture region, a touch-sensitive display, and a configurable area. The screen may be part of an apparatus, or may be an external peripheral device that is attachable to and detachable from the apparatus. The display may be a single-screen display or a multi-screen display. A single physical screen may include multiple displays that are managed as separate logical displays permitting different content to be displayed on separate displays even though they are part of the same physical screen.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A liquid crystal display device comprising:
  a liquid crystal display and a display drive Integrated Circuit (IC);
  a first input terminal and second input terminal located on the display drive IC;
  a first repair amplifier connected to the first input terminal and a second repair amplifier connected to the second input terminal and located on the display drive IC, wherein the first repair amplifier and second repair amplifier are formed on a left side and a right side of the display drive IC, respectively; and
  repair lines connected to respective output terminals of the first repair amplifier and the second repair amplifier, wherein a liquid crystal line or pixel of the liquid crystal display is repaired using one of the repair lines.

2. The liquid crystal display device of claim 1, wherein the first repair amplifier comprises a first line repair amplifier and a first pixel repair amplifier connected to the first input terminal and the second repair amplifier comprises a second line repair amplifier and a second pixel repair amplifier connected to the second input terminal.

3. The liquid display device of claim 1, wherein the input terminal of each of the first and second repair amplifiers is connected to a data bus.

4. The liquid display device of claim 3, wherein the first and second repair amplifiers receive inputs of a channel data signal comprising channel data and repair amplifier data through the data bus.

5. The liquid display device of claim 4, wherein the channel data signal comprises a first region of predetermined length and a second region formed comprising the channel data and the repair amplifier data.

6. The liquid display device of claim 5, wherein the repair amplifier data is located on the front and/or back of the channel data in the second region.

7. The liquid display device of claim 5, wherein the repair amplifier data comprises line repair amplifier data and pixel repair amplifier data.

8. The liquid display device of claim 7, wherein the line repair amplifier data and the pixel repair amplifier data are each N bits in length, respectively.

9. The liquid display device of claim 5, wherein the second region comprises more than two repair amplifier data.

10. The liquid display device of claim 5, wherein the first region comprises control bits that select the operation of the first line repair amplifier and the first pixel repair amplifier or the second line repair amplifier and the second pixel repair amplifier and slew rate control bits that select a slew rate of an operating repair amplifier.

11. The liquid crystal display device of claim 10, wherein the slew rate control bits are N bits in length.

12. The liquid crystal display device of claim 5, wherein the repair amplifier data of the second region comprises R/G/B control bits that select Red (R), Green (G), Blue (B) values of a repair amplifier operating using a channel data signal applied to the repair amplifier.

13. The liquid crystal display device of claim 12, comprising:
  the R/G/B control bits that are each respectively N bits in length.

14. A method of repairing a liquid crystal display device using a repair type data format structure, comprising:
  repairing a defect of a line or a pixel of the liquid crystal display device using the repair type data format structure, wherein the repair type data format structure comprises
  a first region comprising a control bit that selects a line repair amplifier or a pixel repair amplifier and slew rate control bits, and
  a second region comprising a channel data region and a repair amplifier data region.

15. The method of claim 14, wherein the repair amplifier data region comprises a line repair amplifier data region and a pixel repair amplifier data region.

16. The method of claim 15, wherein the repair amplifier data region comprises R/G/B control bits that select Red (R), Green (G), Blue (B) values of a pixel or a line.

17. The method of claim 14, wherein the repair amplifier data region is located on one of a front terminal, a back terminal, or front and back terminals of the channel data region.

18. A liquid crystal display device comprising:
  a liquid crystal display; and
  a display drive IC (Integrated Circuit), located on the liquid crystal display, comprising a first input terminal comprising a first repair amplifier and a second input terminal comprising a second repair amplifier, wherein the first repair amplifier and second repair amplifier are formed on a left side and a right side of the display drive IC, respectively, wherein the liquid crystal display receives a repair signal from the first repair amplifier or the second repair amplifier and repairs a liquid crystal line or pixel of the liquid crystal display using the repair signal.

19. The liquid crystal display device of claim 18, wherein the repair signal is received using repair lines that are connected to respective output terminals of the first repair amplifier and the second repair amplifier.

* * * * *